United States Patent [19]
Quinlan et al.

[11] 3,838,475
[45] Oct. 1, 1974

[54] WINDSHIELD WIPER ASSEMBLY

[75] Inventors: William J. Quinlan; Lawrence L. Huver, both of Hastings, Mich.

[73] Assignee: Hastings Manufacturing Company, Hastings, Mich.

[22] Filed: May 11, 1973

[21] Appl. No.: 359,333

[52] U.S. Cl. ............................ 15/250.32, 24/208 A
[51] Int. Cl. .............................................. B60s 1/40
[58] Field of Search........ 15/250.32, 250.34, 250.42, 15/250.36, 250.31; 24/208 A, 90 H A

[56] References Cited
UNITED STATES PATENTS

| | | | |
|---|---|---|---|
| 2,432,692 | 12/1947 | Smulski | 15/250.32 |
| 3,085,277 | 4/1963 | Bock et al. | 15/250.32 |
| 3,751,754 | 8/1973 | Quinlan et al. | 15/250.42 |
| 3,757,377 | 9/1973 | Hayhurst | 15/250.32 |

FOREIGN PATENTS OR APPLICATIONS

| | | | |
|---|---|---|---|
| 1,069,875 | 2/1954 | France | 15/250.32 |
| 872,862 | 7/1961 | Great Britain | 15/250.32 |
| 1,114,388 | 5/1968 | Great Britain | 15/250.32 |

*Primary Examiner*—Peter Feldman

[57] ABSTRACT

A windshield wiper arm connector assembly includes a molded plastic mounting strip attached to the crown portion of a wiper blade unit, and a molded pladtic wiper arm connector having a support strip superposed over the mounting strip. The support strip has clearance apertures adjacent its opposite ends through which upright pin fasteners integrally molded with the mounting strip extend. The pin fasteners are headed by thermal deformation after the support strip is assembled with respect to the mounting strip so that the headed fasteners loosely retain the support strip superposed over the mounting strip, while permitting limited lateral canting of the support strip relative to the mounting strip. Several arm connector embodiments are provided for use with different types of wiper arms found in the trade, and each embodiment is characterized by having a support strip molded integrally therewith. Each connector embodiment is of simple molded plastic construction and provides for easy connection and disconnection with a wiper arm.

18 Claims, 13 Drawing Figures

PATENTED OCT 1 1974 3,888,475
SHEET 2 OF 2
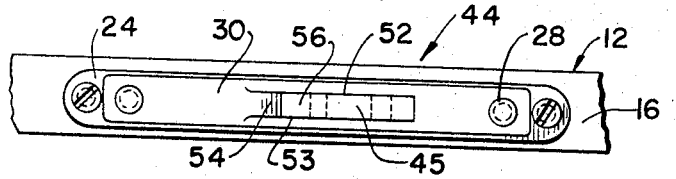
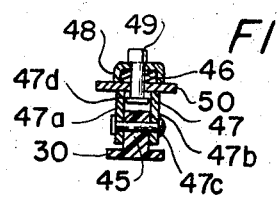
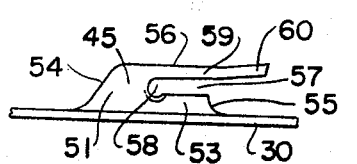
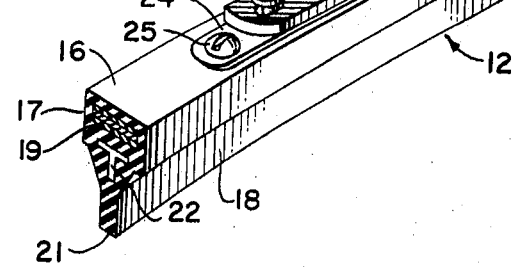
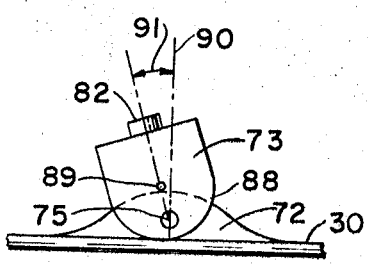
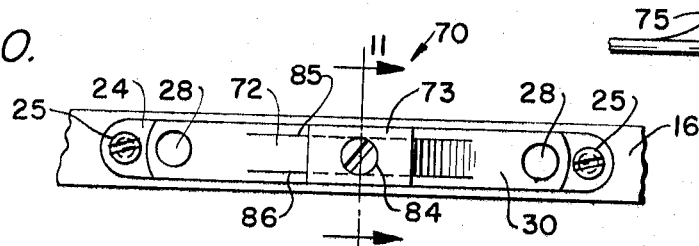
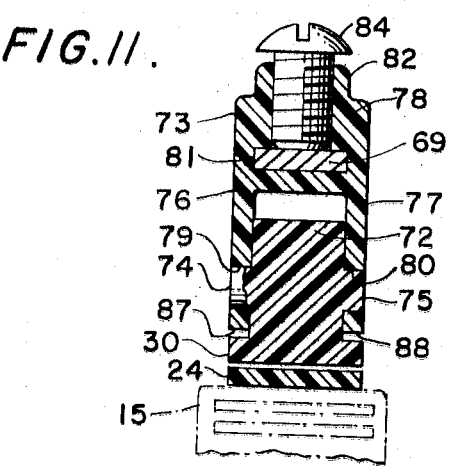
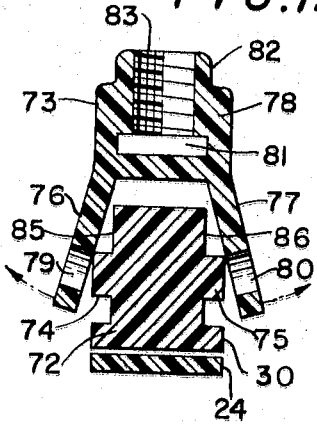

WINDSHIELD WIPER ASSEMBLY

This invention relates to new and useful improvements in windshield wiper assemblies, and in particular the invention concerns itself with the structural and functional improvements in windshield wiper arm connector assemblies which permit a windshield wiper arm to be removably connected to the connector assembly and a wiper blade unit to be supported by the connector assembly to facilitate laterial canting of the blade unit relative to the connector. The invention is an improved arrangement of the windshield wiper assembly disclosed in our related application Ser. No. 259,672, filed June 5, 1972, now U.S. Pat. No. 3,751,754, dated Aug. 14, 1974.

Like the windshield wiper assembly disclosed in our U.S. Pat. No. 3,751,754 the present invention provides means whereby a windshield wiper blade unit is loosely attached to a wiper arm connector so that the blade unit may cant laterally relative to the connector in both wiping directions. This canting action, held within limits, allows the wiping edge of the blade to contact the windshield with the same relationship throughout the length of the blade, which is particularly important with curved blades and windshields having compound curves.

An important feature of the invention is the provision of a wiper arm connector assembly including an elongated mounting strip for mounting on the back of a windshield wiper blade unit and an arm connector for the blade unit. The mounting strip is molded from a plastic material. Integrally molded with the mounting strip are a pair of upwardly extending fasteneners which may be headed by thermal deformation. The fasteners are spaced inwardly from opposite ends of the mounting strip and project upwardly from the upper surface of the mounting strip. The arm connector which is molded from plastic material includes an integral support strip adapted to overlie the mounting strip. The support strip is provided with clearance apertures, of larger diameter than the diameter of the pin fasteners, in which the pin fasteners are rockably disposed to facilitate canting of the blade unit relative to the connector. The pin fasteners are provided with thermably deformed heads spaced above the support strip for retaining the support strip relative to the mounting strip while permitting limited canting of the support strip relative to the mounting strip.

It is another object of the invention to provide new and improved windshield wiper arm connectors for different types of windshield wiper arms.

In one embodiment of the invention the arm connector is specifically adapted for use with a windshield wiper arm having a shepherd's crook type free end. The connector includes a pair of spaced parallel, upright walls which are integrally joined at their base to a support strip along opposite side edges thereof. A transverse pivot pin is integrally connected between the upright walls about which the hooked end of a shepherd's crook type wiper arm may be removably mounted. Spaced rearwardly of the transverse pin at approximately the same height as the pin relative to the support strip are a pair of aligned apertures extending through the upright walls for receiving a lock fastener for retaining the wiper arm in position about the transverse pin. The lock fastener comprises an elongated finger tab having a V-Shaped slot formed in one end to provide a pair of spaced legs. A pair of aligned trunnions which extend laterally from the opposite legs, are adapted to be snap fitted in the aligned apertures of the upright walls by elastically deforming the legs inwardly toward each other, inserting the lock fastener between the walls with the trunnions aligned with the apertures and then releasing the legs so that they spring outwardly to move the trunnions into the aligned apertures.

In another emobidment of the invention the arm connector is specifically adapted for use with a wiper arm having at its free end an inverted channel shaped yoke member in which is supported transverse clevis pin. The arm connector which is integrally molded with a support strip from plastic material is designed to take advantage of the spring characteristics of plastic to retain the clevis pin within a slot extending longitudinally into the connector. The portion of the connector above the slot includes a longitudinally extending lever, or finger piece, which may be flexed upwardly for installing or removing the wiper arm clevis pin. The inherent resilience of the finger piece securely restricts the arm from being disengaged from the connector, yet it permits the wiper blade to be easily installed or removed from the wiper arm. Important features of this embodiment are the simplicity of the connector, the ease of manufacture, and, perhaps the most important from a service station attendant's viewpoint, the absence of loose parts or adjustments to contend with.

In still another embodiment of the invention the arm connector is adapted for use with small or narrow straight arms. The connector includes a trunnion block which is integrally molded with a support strip, and an inverted channel shaped head pivotally supported by a pair of trunnions extending laterally from opposite sides of the trunnion block. A longitudinal slot extending through the upper portion of the head receives the straight end of the wiper arm and a set screw extending through the upper portion of the head locks the wiper arm in position within the slot. The trunnion pins are located so that a good bearing surface between the head and the trunnion block is maintained, which permits the head to pivot about the trunnion pins and allows the wiper blade to pivot or adjust to the curvature of the windshield. The head is molded from a plastic material having sufficient resilience which permits the head to be snapped in place over the laterally extending trunnion pins.

With the foregoing more important objects and features in view and such other objects and features which may become apparent as this specification proceeds, the invention will be understood from the following description taken in conjunction with the accompanying drawings in which like characters of reference designate like parts, and in which:

FIG. 6 is a top plan view looking down on the wiper arm connector assembly shown in FIG. 5 with the wiper arm removed;

FIG. 7 is a vertical sectional view taken on line 7—7 of FIG. 5;

FIG. 8 is a side elevational view of the wiper arm connector and a portion of the support plate illustrated in FIG. 6;

FIG. 9 is an exploded perspective view of still another embodiment of the invention;

FIG. 10 is a fragmentary top plan view of the embodiment shown in FIG. 9;

FIG. 11 is a vertical cross sectional view through the connector arm assembly taken on line 11 of FIG. 10;

FIG. 12 shows the connector head portion illustrated in FIG. 11 with the legs spread apart for removal from the trunnion block.

FIG. 13 is a fragmentary side elevational view of the connector head and trunnion block shows in FIG. 9 with the head displaced to the left of the vertical center line.

Figure 1:
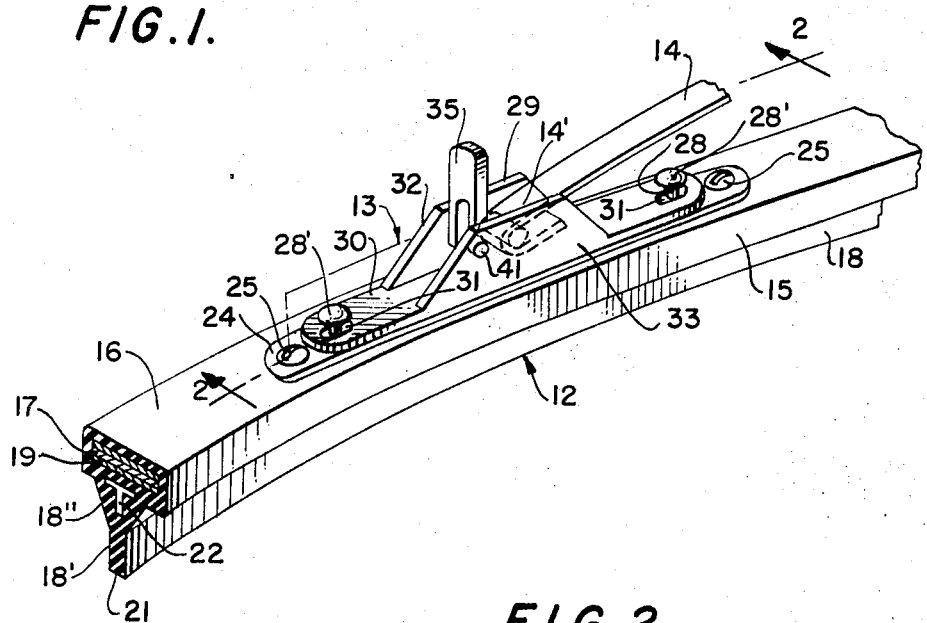
FIG. 1 is fragmentary perspective view of a windshield wiper assembly in accordance with one embodiment of the invention.

Referring now to the accompanying drawings in detail, and more particularly to FIGS. 1-4, one embodiment of the improved windshield wiper assembly is designated generally by the reference numeral 10 and consists of the wiper blade unit 12 (of which only the mid portion is shown), a connector assembly 13 and a windshield wiper arm 14 (of which only the free end portion is shown). The end of the wiper arm remote from the connector assembly 13 would be nonrotatably secured to a wiper shaft (not shown) for rotation with the wiper shaft in a manner which is conventional.

For illustrative purposes the blade unit 12 is preferably of the particular construction disclosed in the aforementioned U.S. Pat. No. 3,571,754. The blade unit 12 includes a blade body 15 formed from resiliently flexible material such as rubber, plastic or the like, the body having a hollow crown portion 16 defining a longitudinally extending open-ended cavity 17 therein, and a lower wiping portion 18 which is integral with the base of the crown portion 16. The elongated cavity 17 contains metallic leaf spring means 19 consisting of a set of leaf springs disposed in superposed relation within the cavity 17 of the crown portion 16. All or at least some of the leaf springs in the set are initially longitudinally curved, although some of them in the set may be initially flat and become longitudinally curved when associated with the others in the set, so as to produce the desired degree of curvature and yieldable support of the blade unit as a whole, all this being in accordance with the disclosure in the aforementioned U.S. Pat. No. 3,571,754. The several springs in the set 19 are secured together, as by a rivet 20.

In accordance with this invention the improved connector assembly 13 includes a normally flat, elongated mounting strip 24 superimposed on the back of the crown portion 16 and rigidly secured to the leaf spring means 19 by a pair of screws 25 engaging threaded apertures 26 in the uppermost leaf springs, and extending through apertures 27 in the end portions of the strip 24. The mounting strip 24 is molded from plastic material and is resiliently bendable to the curved shape of the back of the wiper blade but is rigid and resists bending in the plane of its width. Integrally formed with the mounting strip are a pair of plastic pins 28 spaced inwardly from the ends of the strip and projecting upwardly from the strip. The connector assembly 13 further includes an arm connector 29 having an integrally attached support strip 30. The latter is provided with clearance apertures 31, which loosely or rockably receive the headed pins 28. The looseness of the pins 28 in the clearance apertures 31, together with the spacing of the heads 28' above the support strip permit the blade 12 to become canted laterally with respect to the arm connector 29 thus assuring that the wiping edge 21 of the blade unit is in contact with the windshield throughout the length of the blade as is desirable with longitudinally curved blades and compound-curved windshields of the general type to which the invention relates. The canting action of the blade unit 12 relative to the connector 29 occurs in both wiping directions as described in the aforesaid U.S. Pat. No. 3,571,754. The axial length of the pins 28 and their clearance in the apertures 31 is to be accurately controlled so that only an appropriate amount or degree of canting of the blade unit 12 with respect to the connector 29 is possible. The plastic pins 28 are molded integrally with the plastic mounting strip 24 without the heads 28'. After the support strip 30 is superposed over the mounting strip 24 with the pins 28 projecting through the apertures 31, heat is applied to the ends of the pins and the ends are thermally upset to provide the heads 28'.

It is characteristic of all the embodiments of this invention that the arm connectors have an integrally attached support strip 30 which is loosely secured to the mounting strip 24 for canting action in the manner previously described. Further detailed description of the mounting of the arm connectors of the several embodiments subsequently to be described relative to the mounting strip 24 and wiper blade unit 12 will therefore be omitted.

Figure 2:
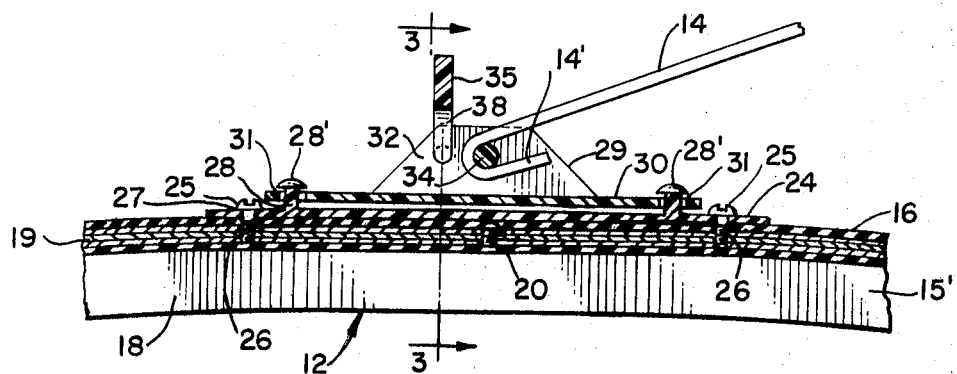
FIG. 2 is a longitudinal vertical sectional view takne along line 2—2 of FIG. 1.
Figure 3:
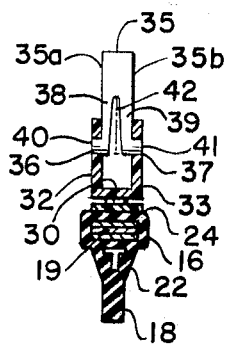
FIG. 3 is a vertical cross sectional view taken along line 3—3 in FIG. 2.
Figure 4:
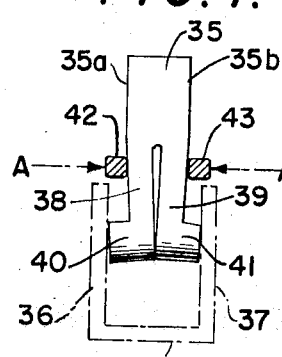
FIG. 4 is an enlarged view of a detail shown in FIG. 3 showing the legs of the locking element compressed for removal from the connector.
Figure 5:
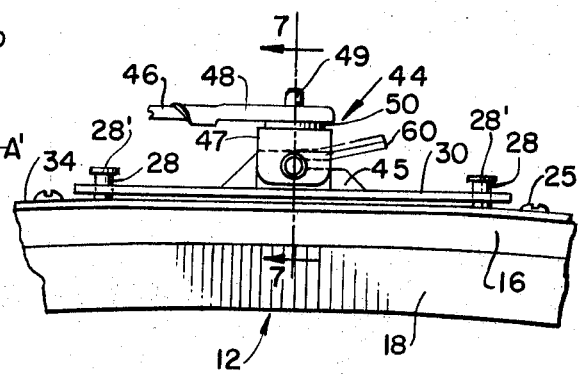
FIG. 5 is a fragmentary side elevational view of another embodiment of the invention.

The arm connector 29 includes a pair of laterally spaced upright walls 32 and 33 extending upwardly from the support strip 30 along opposite side edges thereof and symetrically located between the opposite ends of the support strip. A transverse pivot pin 34 is located approximate the longitudinal center of the upright walls 32 and 33 and is integrally joined at its ends to the wall 32 and 33 a substantial distance above the support strip in order to permit the hooker wiper arm end 14' to be hooked over the pin. The pivot pin 34 pivotally supports the hooked end 14' of the wiper arm 14 between the walls 32 and 33. The distance between the walls 32 and 33 is approximately equal to the width of the wiper arm 14 so that the arm 14 is closely fitted between the upright walls. A pair of axially aligned apertures 36, 37 extend transversely through the walls 32 and 33 on the opposite side of pin 34 from the hooked end 14' and a lock fastener means 35 having axially aligned trunnions 40, 41 is snap fitted into the apertures 36, 37 respectively. The lock fastener means 35 is an elongated plastic finger tab having parallel side edges and a V-shaped slot 42 formed inwardly from one end of the tab along a longitudinal median line to form a pair of spaced legs 38, 39. The trunnions 40, 41 are formed integrally with the free ends of the legs 36, 37 respectively and project laterally therefrom in an axial alignment with each other. The fastener means 35 is molded from a plastic material which has sufficient inherent resilience to permit the legs to be elastically deformed inwardly toward each other as shown in FIG. 4 so that the trunnions may be removed from the apertures 36, 37 and the fastener means may be removed from the arm connector 29. The stiffness of the legs 38, and 39 may be such as to require an operator to use a compression tool to exert force on the legs 38, 39 in the directions as indicated by the arrows A, A'. With the lock fastener means 35 removed from the arm, connector 29 the hooked end 14' may be easily hooked over the pivot pin 34 or removed therefrom. However once the hooked end 14' has been hooked over the pivot pin 34 and the lock fastener means has been snapped in place as illustrated in FIGS. 1–3, the hooked end 14' can not be disassembled from the pivot pin 34 until the lock fastener means 35 has been removed. When the finger tab 35 is locked in position behind the pivot pin 34 the parallel side edges 35a and 35b of the tab closely engage the inside surfaces of the upright walls 32 and 33. The width of the slot 42 must be sufficient so that when the legs 38 and 39 are bent inwardly into engagement with each other, the trunnions 40, 41 may be withdrawn from the apertures 36 and 37 respectively.

In FIGS. 5–8 another wiper arm connector assembly 44 is shown secured to the back of the crown 16 of the wiper blade unit 12. The wiper arm connector assembly 44 includes a mounting strip 24 fastened to the crown 16 and an arm connector 45 having an integral support strip 30 rockably secured to the mounting strip 24 by the headed pins 28 in the same manner as described with reference to the connector arm assembly 13 illustrated in FIGS. 1–4.

The wiper arm connector assembly 44 is particularly adapted for use with a wiper arm 46 having an inverted channel shaped yoke 47 at its free end supported from the free end by means of a clip 48. The yoke 47 is attached to the clip 48 by means of a rivet 49 extending upwardly from beneath the web portion 47d of the yoke and projecting above the top side of the clip 48. A washer 50 is provided between the bottom side of the clip 48 and the top side of the yoke 47 which serves as a bearing surface for the yoke when it is desired to rotate the yoke 47 relative to the clip 48 in order to adjust their angular relationship. The rivet joint is sufficiently tight so that once adjusted the yoke is frictionally retained in its adjusted position relative to the clip until sufficient outside force is again applied to rotate the yoke. Between the side walls 47a and 47b of the yoke 47 is a transverse clevis pin 47c for connection to the arm connector 45. The arm connector 45 includes an upright block 51 joined at its base to the support strip 30 and disposed centrally with respect to the marginal edges of the support strip. The block 51 is defined by a pair of opposite side surfaces 52, 53 (see FIGS. 6–8) which are offset inwardly from the longitudinal side edges of the support strip 30, a pair of sloping end surfaces 54 and 55 and a top surface 56. A transverse slot 57, formed in the block 51 below the top surface 56, extends inwardly from one sloping end surface to approximately the longitudinal center of the block. A cylindrical bore 58 extends transversely through the block at the longitudinal center thereof and forms an enlarged inner end of the slot 57.

The slot 57 is positioned with respect to the top surface 56 so as to form a thin, relatively stiff retainer strip 59 above the slot. The strip 59 is integrally connected at its inner end to the block 51 and it is provided at its outer end with an upwardly sloping finger piece 60 which projects beyond the sloping end surface 55. The retainer strip 59 is sufficiently resilient to permit the strip to be lifted by grasping the finger piece 60 in order to enlarge the height of the slot 57. The cylindrical bore 58 has a diameter approximately equal to the diameter of the clevis pin 47c, or slightly larger, in order to receive the clevis pin therein. The distance between the surfaces defining the slot 57 is normally less than the diameter of the clevis pin 47c in order that the clevis pin when positioned in the bore 58 will be retained therein by the retainer strip 59. However, when the retainer strip is lifted the height of the slot 57 will be increased so that the clevis pin can be slid out of the cylindrical bore 58 through the slot 57.

In FIGS. 9–12 a third wiper arm connector assembly 70 is shown secured to the back of the crown 16 of the wiper blade unit 12. The wiper arm connector assembly 70 includes a mounting strip 24 fastened to the crown 16 and a two piece arm connector 71 having a support strip 30 rockably secured to the mounting strip 24 by the headed pins 28 in the same manner as described with reference to the connector arm assembly 13 illustrated in FIGS. 1–4.

The wiper arm connector assembly 70 is particularly adapted for use with a wiper arm 69 of the type having a straight, flat, rectangularly cross-sectional free end portion as seen in FIG. 9. The wiper arm connector 70 includes an upstanding trunnion block 72 which is integrally joined at its base to the support strip 30 and is disposed centrally with respect to the marginal edges of the support strip, and an inverted channel shaped head 73 which is pivotally supported by trunnions 74, 75 extending laterally from opposite sides of the trunnion block. The head 73 includes a pair of spaced apart, resiliently deformable, parallel side walls 76, 77 which are integrally connected by a top wall portion 78. A pair of axially aligned circular apertures 79, 80 are provided in the side walls 76 and 77 respectively remote from the top wall portion 78 for mounting over the trunnions 74 and 75. A rectangularly cross-sectional socket 81 extends longitudinally through the top wall portion 78 of the head 73 for receiving the free end of the wiper arm 69. Centrally located above the top wall portion of the head 73 is a cylindrical boss through which extends a screw threaded bore 83 that perpendicularly intersects the socket 81. The bore 83 is adapted to receive a lock screw 84 which may be screwed tight against the wiper arm 69 as illustrated in FIG. 11 to lock the wiper arm in the socket 81. The head 73 is normally mounted over the trunnion block 72 with the side walls 76 and 77 flat against the parallel side surfaces 85 and 86 of the trunnion block, however, the side walls 76 and 77 may be resiliently deformed outwardly in order that the trunnions 74 and 75 may be removed from the aligned apertures 79 and 80 and the head may be separated from the trunnion block. The top of the trunnion block 72 is rounded and spaced from the inside surface of the top wall portion 78 to facilitate pivotal movement of the head 73 about the trunnions 74 and 75. Also the side walls 76 and 77 have rounded free end portions 87, 88 in which the apertures 79 and 80 are located substantially below the center of curvature 89 of the rounded end portions. By so positioning the apertures 79 and 80, the head 73 is permitted limited angular movement with respect to the trunnion block to the right or left of the vertical center line 90 as indicated by the angle 91 in FIG. 13. The angular movement of the head to the right or left of the vertical center line 90 is stopped when a point on the curve of the curved end portions 87 and 88 is moved onto the vertical center line 90 that is further displaced from the center of the trunnions 74 and 75 than the distance between the center of the trunnions and the top of the support strip 30 measured along the center line 90. The edge of the curved end portions 87 and 88 contacts the top of the support strip, and further angular displacement from the vertical line 90 is stopped.

While the socket 81 is described as being rectangular, it is to be understood that the socket 81 may be rounded or otherwise configured in cross section to correspond with the cross section of a particular arm.

The head 73, and the support strip 30 with trunnion block 72 integral therewith are each preferably of molded plastic construction, as is the mounting strip 24 with the integral pins 28.

A suitable plastic from which the wiper arm assembly elements of this invention are molded is a synthetic resin sold under the tradename "Delrin" by E. I. du Pont de Nemours and Co. "Delrin" is identified on Page 265 of *The Condensed Chemical Dictionary*, Eight Edition, published by Van Nostrand Reinhold Company; as applied to thermoplastic acetal resins. The plastic may be filled with reinforcing glass fibers, or the like, or it may be unfilled depending on the strength requirement. The elements of the wiper arm assembly may be made from suitable plastics other than "Delrin". The plastic preferably will have a low reflective ratio to avoid causing glare from reflection in a drivers face. Advantages for the use of plastic beside the low reflectance ratio are that the connector assemblies made from the plastic are easily manufactured, they are weather resistant, and will not scratch a windshield.

The wiper arm assemblies of this invention are readily adapted to the exisitng arms of the owner's cars or trucks and particularly for use on foreign cars for which the owner, when replacing a blade, frequently is required to buy a different type wiper arm.

The lower wiping portion of the blade unit which has been described in the foregoing and is illustrated particularly in FIG. 1 includes a narrow wiping lip 18' and an intermediate body portion 18" which is progressively narrower from the base of the crown portion 16 in the direction of the wiping lip. The wiping lip 18' is of uniform thickness from its wiping edge 21 to the juncture with the intermediate body portion 18". A longitudinally extending, normally T-shaped core is provided in the blade body beneath the cavity 17 for purpose described in our aforesaid U.S. Pat. No. 3,571,754 and the related patents and applications set forth therein.

While in the foregoing there have been described and shown the preferred embodiments of the invention various modifications and equivalents may be resorted to within the spirit and scope of the invention as claimed.

What is claimed is:

1. In a windshield wiper arm connector assembly the combination of a normally flat, elongated mounting strip for mounting on the back of a windshield wiper blade unit, and an arm connector for said blade unit, said mounting strip being molded from a plastic material capable of thermal deformation and including a pair of integrally molded pin fasteners spaced inwardly from opposite ends of the mounting strip and projecting upwardly from the upper surface of the mounting strip, said connector including an integrally formed support strip, said support strip being provided with clearance apertures in which said fasteners are rockably disposed to facilitate canting of the blade unit relative to the connector, and said fasteners having thermally deformed heads spaced above said support strip for retaining said support strip assembled relative to said mounting strip.

2. The windshield wiper arm connector assembly according to claim 1 wherein said mounting strip has mounting apertures adjacent opposite ends of said mounting strip for receiving fasteners for securing said mounting strip to the back of a windshield wiper blade.

3. The windshield wiper arm connector assembly according to claim 1 wherein said connector includes a pair of spaced upright walls extending from said support strip, a transverse pivot pin extending between said walls and spaced above said support strip for pivotally supporting the hooked end of a wiper arm between said spaced walls, a pair of aligned apertures extending transversely through said walls and spaced above said support strip and to one side of said pivot pin, and a lock fastener means removably secured in said pair of apertures for holding a wiper arm assembled relative to said pivot pin.

4. The windshield wiper arm connector assembly according to claim 3 wherein said lock fastener means includes an elongated plastic finger tab having a slot formed inwardly from one end thereof along a longitudinal median line to form a pair of spaced elastically deformable legs and laterally projecting trunnions formed intergrally with the free ends of said legs in axial alignment with each other, said plastic finger tab fitting tightly between said walls with said laterally projecting trunnions mounted in said pair of aligned apertures in said walls.

5. The windshield wiper arm connector assembly according to claim 4 wherein the material of said lock fastener has sufficient resilience to permit said legs to be bent inwardly toward each other, and the width of said slot is sufficient so that when the legs are bent inwardly into engagement with each other the trunnions are withdrawn from said aligned apertures.

6. The windshield wiper arm connector assembly according to claim 5 wherein said head is molded plastic material and said support strip and trunnion block are integrally molded plastic material.

7. The windshield wiper arm connector assembly according to claim 1 wherein said connector is adapted for use with a wiper arm having an inverted channel shaped yoke at its free end and a transverse pin through said yoke and includes an upright molded plastic block integrally joined at its base to said support strip and disposed centrally with respect to the marginal edges of said support strip, said block being defined by a pair of spaced opposite side surfaces extending longitudinally with respect to the longitudinal side edges of the support strip, a pair of opposite end surfaces, and a top surface, a transverse slot formed in said block below said top surface and extending inwardly from one end surface, a cylindrical bore extending transversely through the block centrally between said end surfaces and forming an enlarged inner end for said slot, said slot being positioned with respect to said top surface to form a thin stiff retainer strip above said slot which is integrally connected at its inner end to said block, said retainer strip having a finger piece at its free end extending beyond said one end surface for manual manipulation thereof and being sufficiently resilient whereby said retainer strip may be raised about its inner end to enlarge the height of said slot, said cylindrical bore having a diameter which is normally greater than the height of said slot and which is at least substantially equal to the diameter of the transverse pin of said wiper arm, said retainer strip being normally biased by the inherent resilience of said strip so that the height of said slot is less than the diameter of said cylindrical pin, whereby said retainer strip will retain the cylindrical transverse pin of said wiper arm in said cylindrical bore once the wiper arm pin has been positioned therein.

8. The windshield wiper arm connector assembly according to claim 7 wherein said side surfaces of said trunnion block are inset inwardly from the longitudinal side edges of said support strip.

9. The windshield wiper arm connector assembly according to claim 1 wherein said connector is adapted to removably engage the free end of an elongated wiper arm, said connector including a trunnion block integrally joined at its base to said support strip and disposed centrally with respect to the marginal edges of said support strip, a pair of axially aligned trunnions laterally projecting from said trunnion block, an inverted channel shaped head pivotally supported on said trunnion block, said head including a top wall portion, a pair of spaced apart resiliently deformable, parallel side walls integrally connected by said top wall portion and depending therefrom, axially aligned circular apertures provided in said side walls remote from said top wall portion, a longitudinal socket extending through said top wall portion for receiving the free end of said wiper arm, a screw threaded bore extending through said top wall portion and intersecting said socket normal to said socket, a lock screw received in said screw threaded bore for locking a wiper arm in said socket, said head being mounted over said trunnion block with said trunnions extending through the apertures in said side walls, the side walls being normally spaced apart by a distance substantially equal to the thickness of said trunnion block, and being resiliently deformable outwardly so that the trunnions may be removed from said aligned apertures in said side walls.

10. The windshield wiper arm connector assembly according to claim 9 wherein said side walls include rounded free end portions in which said circular apertures are located, said apertures being located substantially below the center of curvature of said rounded end portions.

11. A windshield wiper assembly, the combination of an elongated blade unit having a crown portion and a lower wiping portion integral with the base of said crown portion, and a windshield wiper arm connector assembly for removably connecting said elongated blade unit to a windshield wiper arm, said wiper arm connector assembly including an elongated mounting strip secured to the crown portion of said blade unit and an arm connector for said blade unit, said mounting strip being molded from a plastic material and including a pair of integrally molded pin fasteners spaced inwardly from opposite ends of the mounting strip and projecting upwardly from the upper surface of the mounting strip, said connector including an integrally formed support strip, said support strip being provided with clearance apertures in which said fasteners are rockably disposed to facilitate canting of the block unit relative to the connector, and said fasteners having heads spaced above said support strip for retaining said support strip assembled relative to said mounting strip, said heads being formed by thermally upsetting the ends of said pin fasteners after the support strip is assembled over the mounting strip.

12. The windshield wiper assembly according to claim 11 for connection to a wiper arm having a hooked end, the connector including a pair of spaced upright walls extending from said support strip, a transverse pivot pin extending between said walls and spaced above said support strip for pivotally supporting the hooked end of a wiper arm between said spaced walls, a pair of aligned apertures extending transversely through said walls and spaced above said support strip and to one side of said pivot pin, and a lock fastener means removably secured in said pair of apertures for holding a wiper arm assembled relative to said pivot pin.

13. The windshield wiper assembly according to claim 12 wherein said lock fastener means includes an elongated plastic finger tab having a slot formed inwardly from one end thereof along a longitudinal median line to form a pair of spaced elastically deformable legs and laterally projecting trunnions foremd integrally with the free ends of said legs in axial alignment with each other, said plastic finger tab fitting tightly between said walls with said laterally projecting trunnions mounted in said pair of aligned apertures in said walls.

14. The windshield wiper assembly according to claim 13 wherein the material of said lock fastener has sufficient resilience to permit said legs to be bent inwardly toward each other, and the width of said slot is sufficient so that when the legs are bent inwardly into engagement with each other the trunnions are withdrawn from said aligned apertures.

15. The windshield wiper assembly according to claim 11 wherein said arm connector is adapted for use with a wiper arm having an inverted channel shaped yoke at its free end and a transverse pivot pin through said yoke, said arm connector including an upright molded plastic block integrally joined at its base to said support strip and disposed centrally with respect to the marginal edges of said support strip, said block being defined by a pair of spaced opposite side surfaces extending longitudinally with respect to the longitudinal side edges of the support strip, a pair of opposite end surfaces, and a top surface, a transverse slot formed in said block below said top surface and extending inwardly from one end surface, a cylindrical bore extending transversely through the block centrally between said end surfaces and forming an enlarged inner end for said slot, said slot being positioned with respect to said top surface to form a thin stiff retainer strip above said slot which is integrally connected at its inner end to said block, said retainer strip having a finger piece at its free end extending beyond said one end surface for manual manipulation thereof and being sufficiently resilient whereby said retainer strip may be raised about its inner end to enlarge the height of said slot, said cylindrical bore having a diameter which is normally greater than the height of said slot and which is at least substantially equal to the diameter of the transverse pin of said wiper arm, said retainer strip being normally biased by the inherent resilience of said strip so that the height of said slot is less than the diameter of said cylindrical pin, whereby said retainer strip will retain the cylindrical transverse pin of said wiper arm in said cylindrical bore once the wiper arm pin has been positioned therein.

16. The windshield wiper assembly according to claim 15 wherein said side surfaces of said trunnion block are inset inwardly from the longitudinal side edges of said support strip.

17. The windshield wiper assembly according to claim 11 wherein said connector is adapted to be removably connected to the free end of an elongated wiper arm, said connector including a trunnion block integrally joined at its base to said support strip and disposed centrally with respect to the marginal edges of said support strip, a pair of axially aligned trunnions laterally projecting from said trunnion block, an inverted channel shaped head pivotally supported on said trunnion block, said head including a top wall portion, a pair of spaced apart resiliently deformable, parallel side walls integrally connected by said top wall portion and depending therefrom, axially aligned circular apertures provided in said side walls remote from said top wall portion, a longitudinal socket extending through said top wall portion for receiving the free end of said wiper arm, a screw threaded bore extending through said top wall portion and intersecting said socket normal to said socket, a lock screw received in said screw threaded bore for locking a wiper arm in said socket, said head being mounted over said trunnion block with said trunnions extending through the apertures in said side walls, the side walls being normally spaced apart by a distance substantially equal to the thickness of said trunnion block, and being resiliently deformable outwardly so that the trunnions may be removed from said aligned apertures in said side walls.

18. The windshield wiper assembly according to claim 17 wherein said side walls include rounded free end portions in which said circular apertures are located, said apertures being located substantially below the center of curvature of said rounded end portions.

* * * * *